Sept. 18, 1962  J. LONG  3,054,937

DUAL RANGE MOTOR SPEED CONTROL SYSTEM

Filed Dec. 1, 1959  3 Sheets-Sheet 1

RELATIVE EXCITATION-REFERENCE QUANTITY CHARACTERISTIC SHAPING RANGE USING NON-LINEAR RESISTANCE ELEMENTS

INVENTOR.
JAMES LONG
BY
Vernon H. Kalb
ATTORNEY

Sept. 18, 1962    J. LONG    3,054,937
DUAL RANGE MOTOR SPEED CONTROL SYSTEM
Filed Dec. 1, 1959    3 Sheets-Sheet 2

▨ = NON-LINEAR RESISTANCE ELEMENT

INVENTOR.
JAMES LONG
BY Vernon F. Kalb
ATTORNEY

Sept. 18, 1962

J. LONG 3,054,937

DUAL RANGE MOTOR SPEED CONTROL SYSTEM

Filed Dec. 1, 1959

INVENTOR.
JAMES LONG

BY *Vernon H. Kalb*

ATTORNEY

United States Patent Office 3,054,937
Patented Sept. 18, 1962

3,054,937
DUAL RANGE MOTOR SPEED CONTROL SYSTEM
James Long, Erie, Pa., assignor to General Electric
Company, a corporation of New York
Filed Dec. 1, 1959, Ser. No. 855,085
17 Claims. (Cl. 318—144)

This invention relates to motor control systems, and more particularly relates to a system for controlling both the armature voltage and the field voltage of a direct current motor to control the speed of the motor.

Motor speed control within a limited range is accomplished by controlling the value of the voltage applied to the armature circuit of the motor. However, many applications require a wider motor characteristic control range than is available by armature voltage control alone. To provide additional range, motor field control is employed. The speed of rotation of a motor which is established at rated field exciting current and maximum rated armature voltage is referred to as base speed. If the speed is to be increased above base speed, such increase in speed can only be accomplished by reduction of the exciting current. Within the base speed range of the motor the exciting current is constant at its maximum value. Above the base speed, the speed of the motor varies essentially hyperbolically with field excitation. Due to the hyperbolic relationship, at low values of field excitation, a small decrease in excitation causes a corresponding relatively large increase in motor speed. As the field excitation is decreased, the field excitation characteristic as a function of motor speed approaches zero slope value. When motor field excitation is being decreased to increase motor speed, it may thus be seen that to obtain accurate speed control by adjusting a reference quantity indicative of speed, the reference quantity-field excitation characteristic should closely approximate the actual motor speed-field excitation characteristic.

This invention is concerned with the provision of a new and improved arrangement wherein the excitation of the motor field is made to follow an established hyperbolic function with respect to a speed reference quantity which may be made to closely approximate the excitation-speed characteristic of a motor.

It is an object of this invention to provide an adjustable speed drive for a direct current motor including improved means for establishing motor field excitation as a predetermined hyperbolic function with respect to a speed reference quantity.

It is another object of this invention to provide in such a system an improved method of compensating for motor armature reaction at low values of field excitation.

It is a further object of my invention to provide an adjustable speed drive for a direct current motor and improved motor reversing arrangement.

Briefly stated, these and other objects of my invention are achieved in one form thereof by provision in an adjustable speed drive for an electric motor of means for decreasing the field voltage in accordance with a predetermined function through adjustment of a speed reference quantity. Adjustment of the speed reference quantity above a predetermined value decreases the voltage output of a motor field amplifier, and feedback means responsive to motor voltage modify the effect of the speed reference quantity on the field amplifier, and further means responsive to the speed reference quantity may be provided to modify the output of the field amplifier when the speed reference quantity exceeds a given value. The modifying means are cooperative to decrease the field voltage and hence the field current in accordance with a predetermined function. Armature reaction compensation means are also provided to strengthen the motor field upon application of load thereto at low values of field excitation to prevent undesired acceleration, and simplified reversing means are also provided which obviate the problem of interrupting large values of motor armature current to effect reversal of direction of rotation of the motor.

The features of the invention which are believed to be novel are set forth with particularity in the appended claims. The invention itself, however, both as to its organization and method of operation, together with further objects and advantages thereof, can best be understood by referring to the following description when taken in connection with the following drawings wherein:

Figure 1:
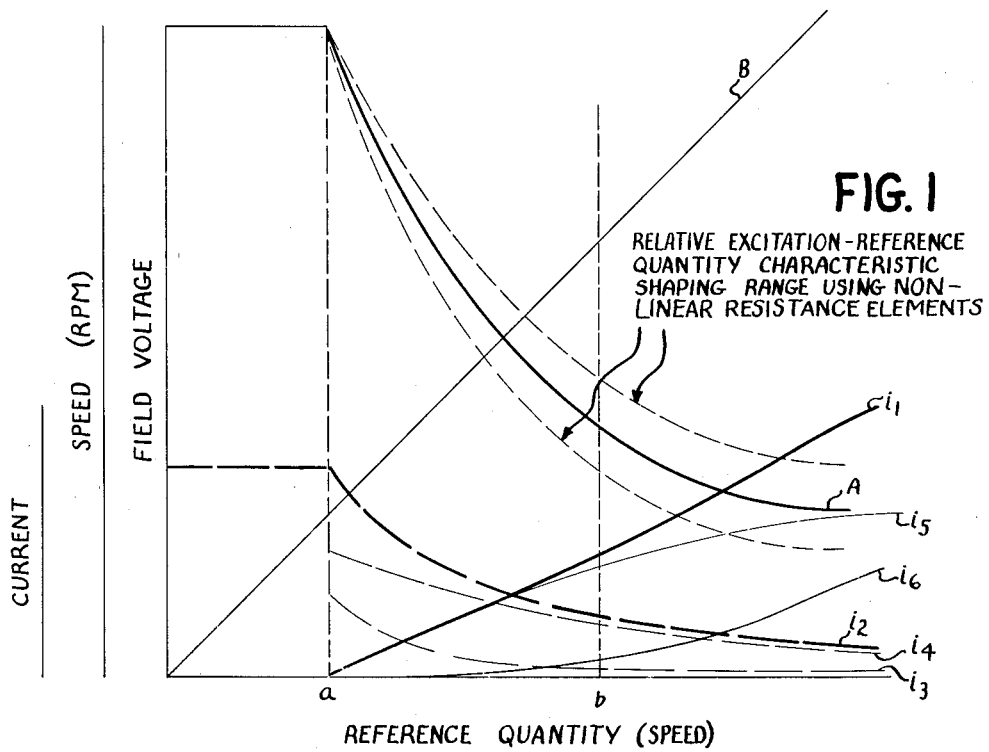
FIGURE 1 is graphically illustrative of a typical field excitation-speed characteristic of a direct current motor and the relationship of motor field voltage and various currents in the circuits embodying the invention with respect to a speed reference quantity.

Referring now to FIG. 1, which illustrates by curve A a typical field voltage-speed characteristic of a direct current motor, it is seen that as field voltage, and hence field current, decreases, the speed of the motor increases at an ever-increasing rate. At low values of field excitation very little change in field voltage is required to produce a large change in speed. Curve B illustrates a plot on the same axis of a speed reference quantity voltage versus speed. This last-mentioned curve illustrates the desired linearity between the speed reference quantity and motor speed. To achieve this linearity, it is necessary to control the field excitation in accordance with hyperbolic relationship exemplified by curve A.

Figure 2:
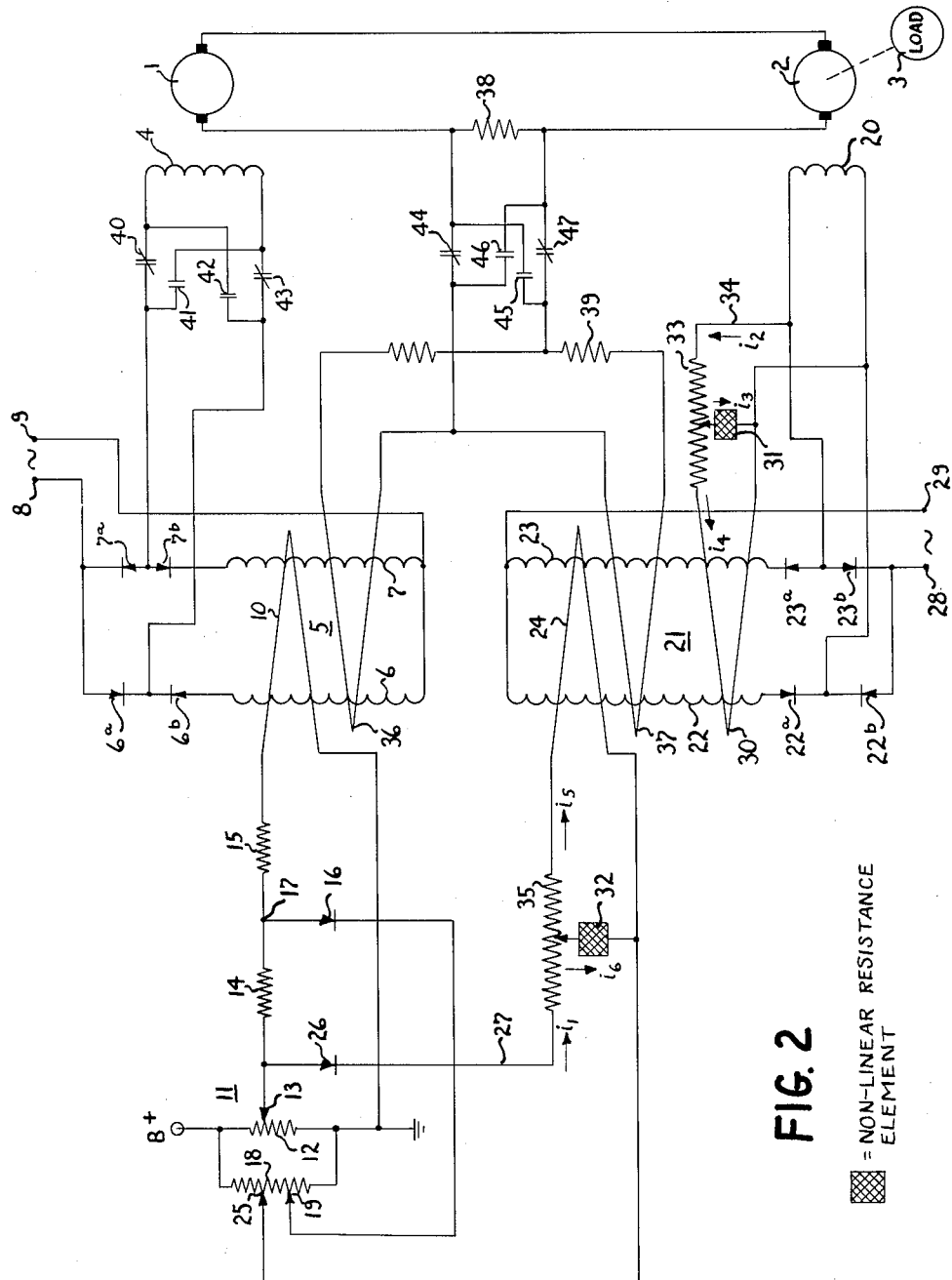
FIGURE 2 is illustrative of an adjustable speed motor drive system embodying my invention.

Reference is now made to FIG. 2 wherein I show an adjustable speed motor drive system comprising an amplifier, such as generator 1 driven by a prime mover, not shown, and supplying electrical energy to the armature of a direct current motor 2 which drives a load 3. The excitation of the generator, and hence its terminal voltage, is controlled by the excitation of generator field winding 4, which is supplied unidirectional electrical energy from magnetic amplifier 5 having gate windings 6 and 7 with associated rectifying elements 6a, 6b and 7b respectively. The magnetic amplifier is supplied alternating current energy from terminals 8 and 9 from an alternating current source, not shown. The direct current (D.C.) output of the magnetic amplifier is supplied to the generator field winding 4. The magnitude of the output of the magnetic amplifier is controlled by the magnitude of current in control winding 10 on the magnetic amplifier. The control winding is so poled that the output of the magnetic amplifier increases with an increase in control current. Control current is supplied to control winding 10 from a voltage reference source 11, which comprises potentiometer 12 connected to a source of positive D.C. potential, not shown. Potentiometer has an adjustable tap 13 thereon. A voltage dividing network comprising resistors 14 and 15 and unidirectional conducting device 16 connected to point 17 between resistors 14 and 15 provides a limit to the voltage applied to winding 10, and hence the current therethrough. Unidirectional conducting device 16 is back-biased by a predetermined voltage derived from voltage divider 18. When the potential at point 17 exceeds the potential on the voltage divider 18 at tap 19, the back-bias on unidirectional conducting device 16 is overcome and the magnetic amplifier control winding 10 is shunted, thus placing a limit on the current therethrough.

The motor 2 has a separately excited field 20 which is excited by unidirectional current from magnetic amplifier 21, having gate windings 22 and 23 and associated rectifying elements 22a, 22b, 23a and 23b. Magnetic amplifier 21 has a control winding 24 thereon having a polarity such that an increase in current in the control winding 24 causes a decrease in output voltage of the magnetic amplifier, and hence a decrease of excitation current in motor field 20. Control current will flow in control winding 24 when the voltage at tap 13 of potentiometer 12 exceeds a predetermined value. This predetermined value is established by the setting of tap 25 on voltage divider 18. A unidirectional conducting device 26 is in series-circuit relationship with control winding 24 and so poled to prevent flow of current through control winding 24 from tap 25 to potentiometer 12. Generally the elements 16 and 26 are so biased that when the reference potential reaches a predetermined value and element 16 commences to conduct to clamp the input to control winding 10, element 26 commences to conduct to weaken the motor field.

When tap 13 on potentiometer 11 is set at a potential which exceeds the potential required to apply rated armature voltage to the motor, current will flow through unidirectional conducting device 26, through line 27 and control winding 24 back to point 25 on voltage divider 18 and thence to ground. This current in control winding 24 decreases the magnetization of magnetic amplifier 21 which increases the impedance offered to the alternating current source, not shown, connected to terminals 28 and 29, thereby decreasing the current in motor field 20, which in turn allows the motor to increase in speed.

In the operation of the circuit thus far described, adjustment of tap 13 on potentiometer 12 from zero voltage to a predetermined voltage increases the excitation of generator field 4, thereby increasing the terminal voltage of generator 1. The increase in terminal voltage of generator 1 increases the voltage applied to motor 2, and hence the speed of the motor. This is the well-known armature range speed control. Adjustment of tap 13 above the predetermined potential value, has no further effect on the field excitation of generator 1, and hence the terminal voltage of generator 1, and overcomes the back-bias on rectifier 26 to supply a control current to winding 24 on magnetic amplifier 21 which decreases the direct current output voltage of magnetic amplifier 21, and hence decreases the field excitation of motor 2, allowing the motor to increase in speed. It is thus readily apparent that at a predetermined setting of potentiometer 12, motor speed control crosses over from control of motor armature voltage to control of motor field voltage.

Once the motor field starts to weaken, the speed increases at an ever-increasing rate with small decreases in field excitation. It is therefore desirable to provide a field current-reference voltage characteristic corresponding to the excitation-speed characteristic of the motor.

In accordance with my invention, I provide means to shape the current output characteristic of the magnetic amplifier 21 to correspond to the excitation-speed characteristic of the motor. Establishing such a relationship is often referred to as programming the motor field. I provide means associated with magnetic amplifier 21 for programming the excitation of field 20.

I provide a feedback winding 30 which is shunted by an element 31 having a negative impedance characteristic with respect to voltage, and have further shunted control winding 24 with a second element 32 having a negative impedance characteristic with respect to voltage. In the embodiment illustrated, I prefer that the impedance elements 31 and 32 be of the non-linear type characterized by the fact that the resistance of the element decreases exponentially as the voltage across the element increases.

Consider now the operation of the system illustrated in FIG. 2 in conjunction with the curves of FIG. 1. Below base speed of the motor the voltage across winding 20 is a maximum. Magnetic amplifier control winding 30 is connected across motor field 20, and this control winding circuit includes series voltage divider 33 and negative impedance characteristic element 31. The purpose of voltage divider 33 is to limit the current in control winding 30 and also the current through the negative impedance characteristic element 31. At rated motor field voltage, the impedance of element 31 is very low and this element substantially short circuits control winding 30. Therefore, control winding 30 is not effective to vary the output of magnetic amplifier 21.

Figure 3:
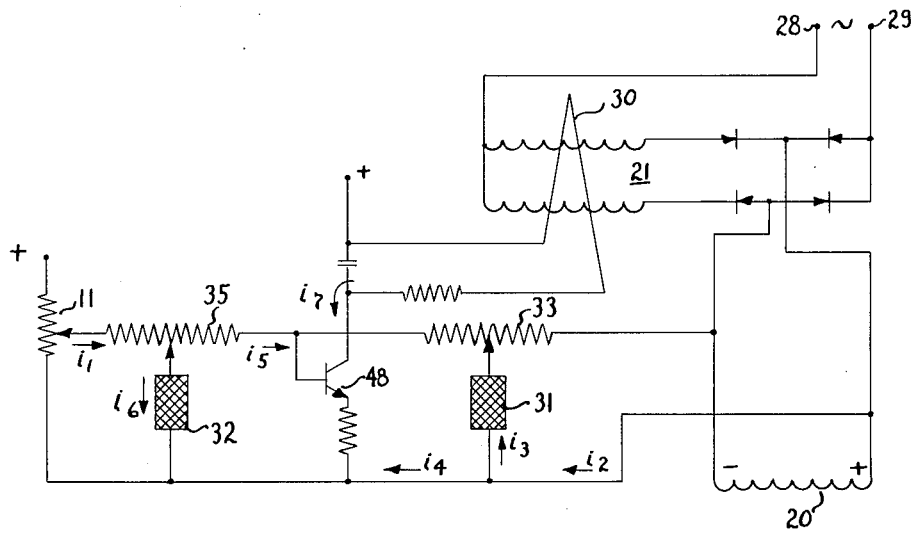

When tap 13 on potentiometer 12 is adjusted to reference voltage value $a$, FIG. 3, motor speed increases into the field control range, a current $i_1$ flows in line 27 and divides between element 32 and control winding 24 in a ratio dependent upon the voltage across element 32. Flow of current in control winding 24 decreases the voltage output of the magnetic amplifier and hence the voltage across field winding 30, thereby decreasing the exciting current therethrough. The voltage across motor field winding 20 produces current $i_2$ in line 34 which divides into current $i_3$ through element 31 and $i_4$ through control winding 30. The sum of currents $i_3$ and $i_4$ of course is always equal to the value of current $i_2$. As the voltage across motor field winding 20 decreases, the voltage across element 31 decreases and the resistance of element 31 increases. As the resistance of element 31 increases, the reduction in the rate of decrease of current $i_4$ through winding 30 is decreased with decrease of voltage across motor field 20. The net effect of current in the oppositely poled windings 24 and 30 is to decrease the rate of reduction of motor field current with increase in potential at potentiometer tap 13 to shape the reference quantity-field excitation characteristic A, FIG. 2. Further increase in the potential at tap 13 causes a decrease in motor field voltage in accordance with an established or programmed function. If the negative impedance characteristic element 31 is of exponential form, as the voltage across element 31 decreases, a point is reached at which the resistance no longer increases in the desired manner, approximately reference voltage value $b$, FIG. 1. If element 31 has an exponential impedance characteristic, I add an additional negative impedance characteristic element 32, preferably having an exponential characteristic also, across control winding 24 in conjunction with series voltage divider 35.

As the reference potential reaches the value $b$, FIG. 1, the voltage across field 20 has fallen to a value where further decrease in the voltage across element 31 causes no appreciable change in resistance. At this point the element 31 has no appreciable effect on the current $i_4$ in winding 30. However, the voltage across element 32 has reached such a value that the resistance of this element decreases at an increasing rate with increase in reference potential, thereby providing a shunt across control winding 24, and the current $i_5$ in control winding 24 now increases at a less rapid rate with increase in reference potential, thereby decreasing the rate of decrease of motor field voltage with increase in reference potential.

By proper selection of elements 31 and 32 and voltage dividers 33 and 35, the excitation-speed characteristic of the motor may be closely approximated and may be made to fall anywhere within the range indicated in FIG. 1.

In the system described, I also make provision for IR compensation by providing winding 36 on magnetic amplifier 5. A voltage proportional to motor armature current is developed across resistor 38 and applied to winding 36 to effect IR compensation.

In addition to the provision of a novel amplifier arrangement for programming a motor field, the amplifier has another unique feature. One of the difficulties encountered in controlling or running motors with a very weak field is the effect of armature reaction. At low values of field excitation, the effect of armature reaction tends to further weaken the field. When a motor is running at high speed and weak field, it has a tendency to increase its speed as load is applied, due to increased armature current and hence armature reaction. In most cases this tendency to increase speed is not acceptable. Normally the effects of armature reaction are counterbalanced by a differential series winding on the motor field poles that increases the field strength as load is applied. With this differential series field, upon reversal of direction of rotation of the motor, heavy contactors must be provided to maintain the direction of flow of armature current in order not to reverse the differential field. However, with the arrangement I have disclosed, a circuit comprising resistor 38, resistor 39 and winding 37 on the magnetic amplifier performs this function. A voltage proportional to load current is picked off resistor 38. This voltage produces a current flow in control winding 37 which tends to increase the output of amplifier 21, thereby increasing field excitation. The compensation circuit described obviates the need for a series compensation field and simple means such as a small relay can be used to reverse a small control current obviating the necessity of providing contacts to interrupt a heavy armature current.

I have shown reversing contacts 40, 41, 42 and 43 in the generator field circuit to accomplish reversal of generator field current. These contacts may be actuated by a small relay not shown, or even a double pole-double throw switch. A similar reversing arrangement with contacts 44, 45, 46 and 47 is utilized to reverse the current indicative voltage picked off from resistor 38, and both contact reversing arrangements may be actuated from the same relay or switch.

If a static power amplifier is to be used in a system embodying my invention, then the motor field may be reversed to effect reversal of direction of rotation of the motor armature. In such a case, the reversing contacts would be placed in the motor field circuit so as not to reverse the direction of current flow through feedback winding 30.

It is to be understood that the generator 1 may be replaced with a static power amplifier such as a magnetic amplifier. The negative impedance characteristic elements 31 and 32 may be any of a number of well known elements which exhibit an exponential or non-linear negative resistance characteristic with respect to voltage. For example, germanium diodes exhibit such a negative resistance characteristic with respect to voltage; however, inasmuch as germanium diodes have a relatively low voltage rating, the use of germanium would not be feasible unless a plurality of such diodes were connected in series. Other impedance arrangements having the desired voltage-resistance characteristic will occur to those skilled in the art. It will also be apparent that in some instances the shunt elements 31 and 32 could be replaced with an impedance arrangement including a series element whose resistance increases as the voltage thereacross increases. It is obvious that the control signal and the feedback signal could be applied in opposition to a single winding on the magnetic amplifier 21.

Figure 4:
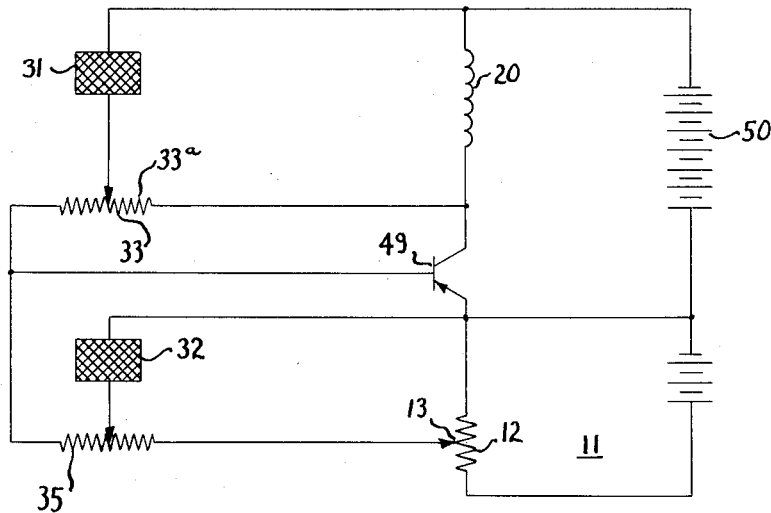
FIGURES 3, 4 and 5 illustrate modifications of the invention in various motor field amplifiers.
Figure 5:
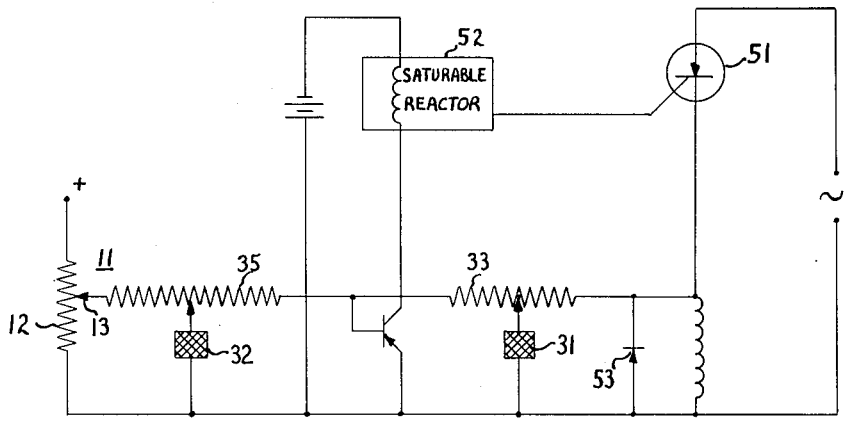

In FIGS. 3, 4 and 5, I illustrate other motor field amplifying arrangements embodying my invention, and like numerals to those used in FIG. 1 identify like parts. For ease of illustration, the motor armature voltage control circuit is not included in FIGS. 3, 4 and 5. In the field amplifying arrangement shown in FIG. 3, both control and feedback signals are applied to a single control winding 30 on magnetic amplifier 21. Transistor amplifier 48, having a voltage supply source, not shown, is provided which amplifies the difference between the control signal and the feedback signal, the amplified difference signal being applied to control winding 30. This difference current $i_7$ is proportional to the difference between currents $i_5$ and $i_4$. Use of a transistor to amplify the difference signal requires less control current; therefore, the resistance value of the voltage dividers 33 and 35 may be larger to reduce the level of the control current required.

In FIG. 4 I show another field amplifier arrangement using a power transistor 49 as the field supply amplifier. This arrangement replaces magnetic amplifier 21 with power transistor 49 and accompanying transistor voltage source 50. When transistor 49 is heavily conducting, practically all of the voltage of source 50 appears across motor field 20 and also across the field shunting combination of element 31 and portion 33a of voltage divider 33. As the reference voltage is increased, the base of transistor 49 is biased more positive tending to drive the transistor towards cut-off. This increases the voltage across transistor 49 and decreases the voltage across field 20 and the element 31 decreases, the resistance increases, resulting in a less rapid rate of field weakening. As the potential at tap 13 is further increased, element 32 commences to shunt the base-emitter circuit of transistor 49, thereby decreasing the rate of increase of positive biasing of the base of transistor 49 with increase of reference potential at tap 13. The overall effect is the same as described in conjunction with FIG. 2. In this embodiment of my invention element 31 and resistance 33a must be so chosen in value that this combination does not provide too low a resistance shunt path about the motor field 20 at maximum field voltage. It may be seen in this embodiment that transistor 49 is operated as an impedance variable with respect to the reference voltage.

In FIG. 5 I show another field amplifying arrangement embodying my invention. This arrangement is similar to that of FIG. 4; however, the magnetic amplifier 21 has been replaced by a controlled rectifier 51 and a small saturable reactor 52 to apply a firing signal to the controlled rectifier 51. The action of a controlled rectifier is similar to that of a thyratron. When a firing signal is applied to the controlled rectifier, it will conduct so long as the potential at the anode exceeds a predetermined value. In this modification of my invention, I also provide a commutating rectifier 53 across the motor field 20, inasmuch as a rectified single phase alternating current is applied across the motor field 20 from a source, not shown.

It will be obvious that the means I have shown in FIG. 2 for compensating for armature reaction at weak field is equally applicable to the arrangement of FIG. 3. Such compensation may also be incorporated in the arrangement of FIG. 5 by applying a motor armature current indicative signal to a control winding on the saturable reactor 52 to adjust the firing angle of controlled rectifier 51. It will be apparent to one skilled in the art that similar armature reaction compensation could be achieved in an adjustable speed drive using the field amplifying arrangement of FIG. 4. Simple circuitry may be provided to provide a negative armature current indicative signal on the base of PNP transistor 49 to increase conductance of transistor 49 and hence field current in response to an increase in armature current.

While I have illustrated and described preferred embodiments of this invention and modifications thereto, further changes in the disclosed embodiments may occur to those skilled in the art without departing from the spirit and scope of this invention. Accordingly, it is my intention to cover all changes and modifications of the examples of the invention herein chosen for purposes of disclosure, but do not constitute departures from the spirit and scope of the invention.

What I claim as new and desire to secure by Letters Patent of the United States is:

1. An arrangement for controlling the speed of a direct current motor comprising, means providing an electrical reference quantity having a magnitude selectable in accordance with a desired operating speed of the motor, a direct current motor having a separately excited field, an amplifier for supplying electrical energy to the armature circuit of said motor dependent on the magnitude of said reference quantity, a second amplifier for supplying exciting current to said field, said second amplifier being effective to reduce the motor field voltage and hence the field current in response to increases in said reference quantity above a predetermined magnitude, means responsive to decreases in magnitude of the voltage across said field for decreasing the rate of reduction of the field current with respect to increases in magnitude of the reference quantity and means responsive to increases in magnitude of said reference quantity for decreasing the rate of effect of said reference quantity on the field current.

2. An arrangement for controlling the speed of a direct current motor comprising, means providing an electrical reference quantity having a magnitude selectable in accordance with a desired operating speed of the motor, a direct current motor having a separately excited field, an amplifier for supplying electrical energy to the armature circuit of said motor dependent on the magnitude of said reference quantity, a second amplifier for supplying exciting current to said field, means to reduce the output voltage of said second amplifier in response to increases in said reference quantity above a predetermined magnitude, means responsive to decreases in magnitude of the output voltage of said second amplifier for decreasing the rate of reduction of output voltage of said second amplifier in response to increases in magnitude of the reference quantity, and means responsive to increases in magnitude of said reference quantity for decreasing the rate of effect of said reference quantity on the voltage output of said second amplifier.

3. In an adjustable speed drive for a direct current motor comprising, means for providing a speed reference voltage having a magnitude determining the speed of said motor, means for exciting the motor field circuit in accordance with a desired speed-field excitation characteristic, said means being effective to decrease the voltage across said field with increase in the reference voltage magnitude, impedance means having a negative resistance characteristic with respect to voltage shunting said field to decrease the rate of reduction of current through said field with increase in the reference quantity magnitude, and means responsive to the magnitude of the reference quantity to decrease the rate of reduction of the motor field current with increasing reference quantity magnitude.

4. The arrangement of claim 3 wherein said impedance means comprises an element having a non-linear resistance characteristic.

5. In an adjustable speed drive for a direct current motor comprising, means providing an electrical reference quantity having a magnitude selectable in accordance with a desired operating speed of said motor, means for exciting the motor field circuit in accordance with a desired speed-field excitation characteristic, said means being effective to decrease the voltage across said field with increase in the reference quantity magnitude, an impedance having a negative resistance characteristic with respect to voltage shunting said field whereby as the voltage across said field decreases with increase in the reference quantity magnitude the rate of decrease of current through said field is reduced and means responsive to the magnitude of the reference quantity to decrease the rate of reduction of the motor field current with increasing reference quantity magnitude.

6. In an adjustable speed drive for a direct current motor comprising, means providing an electrical reference quantity having a magnitude selectable in accordance with a desired operating speed of said motor, amplifying means for exciting the motor field circuit in accordance with a desired speed-field excitation characteristic, said amplifying means being effective to reduce the field voltage in response to increases in the reference quantity magnitude, means responsive to decreases in field voltage for decreasing the rate of reduction of output voltage of said amplifier with increase in the reference quantity magnitude, and means responsive to the magnitude of the reference quantity to decrease the rate of reduction of the motor field voltage with increasing reference quantity magnitude.

7. In an adjustable speed drive for a direct current motor comprising, means providing an electrical reference quantity of adjustable magnitude having a magnitude selectable in accordance with a desired operating speed of said motor, magnetic amplifying means for exciting the motor field circuit in accordance with a desired speed quantity-field excitation characteristic, a control winding on said magnetic amplifying means for supplying a control current therethrough to reduce the voltage output of said magnetic amplifying means in response to increases in the magnitude of the reference quantity, a feedback control winding on said magnetic amplifying means for supplying a current to said feedback winding responsive to the voltage across said motor field to oppose the effect of said control current on the output of said amplifying means, impedance means having a negative resistance characteristic with respect to voltage shunting said feedback winding whereby decreases in motor field voltage decreases the rate of reduction of motor field voltage with increase in reference quantity magnitude.

8. The arrangement of claim 7 wherein said impedance means includes an element having a non-linear resistance characteristic.

9. In an adjustable speed drive for a direct current motor comprising, means providing an electrical reference quantity of adjustable magnitude having a magnitude selectable in accordance with a desired operating speed of said motor, magnetic amplifying means for supplying excitation to the motor field circuit in accordance with a desired speed-field excitation characteristic, a control winding on said magnetic amplifying means for supplying a control current therethrough to reduce the voltage output of said magnetic amplifying means in response to increase in the reference quantity, a feedback control winding on said magnetic amplifying means for supplying a current to said feedback winding responsive to the voltage across said motor field to oppose the effect of said control current on the output of said amplifying means, impedance means having a negative resistance characteristic with respect to voltage shunting said feedback winding whereby decreases in motor field voltage decrease the rate of reduction of motor field voltage with increase in reference quantity magnitude, second impedance means having a negative resistance characteristic with respect to voltage shunting said control winding whereby increases in reference quantity magnitude decrease the rate of increase of current in said control winding.

10. The arrangement of claim 9 wherein the two impedance means comprise elements having a non-linear resistance characteristic.

11. In an adjustable speed drive for a direct current motor having a separately excited field comprising, means providing an electrical reference quantity having a magnitude selectable in accordance with a desired operating speed of said motor, a variable impedance element and a source of unidirectional energy in series circuit relation with said field, a second impedance having a negative resistance characteristic with respect to voltage shunting said field, means to increase the impedance of said element with increase in magnitude of the reference quantity thereby decreasing the voltage across said field and said second impedance, the magnitude of said second impedance increasing with a decrease in voltage thereacross whereby the rate of decrease of current through said field is reduced as the magnitude of the reference quantity increases.

12. In an adjustable speed drive for a direct current motor having a separately excited field comprising, means providing an electrical reference quantity having a magnitude selectable in accordance with a desired operating speed of said motor, a variable impedance element and a source of unidirectional energy in series circuit relation with said field, a second impedance having a negative resistance characteristic with respect to voltage shunting said field, means to increase the impedance of said element with increase of the reference quantity thereby decreasing the voltage across said field and said second impedance, the magnitude of said second impedance increasing with a decrease in voltage thereacross whereby the rate of decrease of current through said field is reduced as the magnitude of the reference quantity increases a third impedance having a negative resistance characteristic with respect to voltage shunting said reference quantity providing means thereby reducing the rate of effect of increase of reference quantity magnitude on said variable impedance element.

13. In an adjustable speed drive for a direct current motor comprising, means providing an electrical reference quantity having a magnitude selectable in accordance with a desired operating speed of said motor, magnetic amplifying means for supplying excitation to the motor field circuit in accordance with a desired speed-field excitation characteristic, a control winding on said magnetic amplifying means, means for supplying a control current thereto to reduce the voltage output of said magnetic amplifying means in response to increases in magnitude of the reference quantity, means responsive to decreases in motor field voltage for supplying a second current to said winding in opposition to the control current to decrease the rate of reduction of the output voltage of said magnetic amplifier with increase in the magnitude of the reference quantity.

14. In an adjustable speed drive for a direct current motor comprising, means providing electrical reference quantity having a magnitude selectable in accordance with a desired operating speed of said motor, magnetic amplifying means for supplying excitation to the motor field circuit in accordance with a desired speed-field excitation characteristic, a control winding on said magnetic amplifying means, means for supplying a control current thereto to reduce the voltage output of said magnetic amplifying means in response to increases in magnitude of the reference quantity, means responsive to decreases in motor field voltage for supplying a current to said winding in opposition to the control current to decrease the rate of reduction of the output voltage of said magnetic amplifier with increase in the magnitude of the reference quantity, and means responsive to increases in said reference quantity magnitude for decreasing the rate of increase in control current applied to said control winding with increase in magnitude of the reference quantity.

15. In an adjustable speed drive for a direct current motor having a separately excited field, means providing an electrical reference quantity having a magnitude selectable in accordance with a desired operating speed of said motor, means for supplying electrical energy to the armature circuit of said motor, an amplifier for supplying current to said field current in accordance with the magnitude of the reference quantity, the magnitude of the field current decreasing in accordance with a predetermined characteristic with increase in magnitude of the reference quantity, means to compensate for armature reaction in said motor at low values of field excitation comprising means to derive a signal indicative of motor armature current and means to apply the derived signal to said amplifier to increase the field strength of said motor in response to an increase in armature current.

16. In an adjustable speed drive for a direct current motor comprising, means for providing a speed reference voltage having a magnitude determining the speed of said motor, means for exciting the motor field circuit in accordance with a desired speed-field excitation characteristic, said means being effective to decrease the voltage across said field with increase in the reference voltage magnitude, an impedance having a negative resistance characteristic with respect to voltage shunting said reference voltage providing means whereby as the voltage across said field decreases with increase in the reference quantity magnitude the rate of decrease of current through said field is reduced.

17. An adjustable speed drive for a direct current motor having a separately excited field comprising, means for providing a speed reference voltage having a magnitude determining the speed of said motor, an amplifying device for providing an exciting voltage across said field, an increase in said reference quantity being effective to cause said amplifying device to reduce the voltage across said field, an impedance having a negative resistance characteristic with respect to voltage shunting said field, the magnitude of said impedance increasing with a decrease in voltage across said field whereby the rate of decrease of current through said field is reduced as the magnitude of the reference voltage increases.

References Cited in the file of this patent

UNITED STATES PATENTS

| | | |
|---|---|---|
| 2,507,198 | Dinger et al. | May 9, 1950 |
| 2,641,735 | Elliot | June 9, 1953 |
| 2,855,555 | Anger | Oct. 7, 1958 |
| 2,929,975 | Caldwell et al. | Mar. 22, 1960 |